United States Patent [19]

Shiode

[11] 4,194,835

[45] Mar. 25, 1980

[54] EXPOSURE DEVICE

[75] Inventor: Tsuyoshi Shiode, Yokohama, Japan

[73] Assignee: Tokyo Shibaura Denki Kabushiki Kaisha, Kawasaki, Japan

[21] Appl. No.: 944,549

[22] Filed: Sep. 21, 1978

[30] Foreign Application Priority Data

Sep. 27, 1977 [JP] Japan ............................ 52-129767[U]

[51] Int. Cl.² ...................... G03G 15/00; G03B 27/54
[52] U.S. Cl. .......................................... 355/67; 355/11
[58] Field of Search .................. 355/67, 70, 84, 8, 11; 362/296, 341, 346, 347, 348

[56] References Cited

U.S. PATENT DOCUMENTS

| 1,513,845 | 11/1924 | Michel | 362/348 |
| 3,062,110 | 11/1962 | Shepardson et al. | 355/11 |
| 3,532,424 | 10/1970 | Miles | 362/346 |

FOREIGN PATENT DOCUMENTS

| 545393 | 3/1956 | Belgium | 362/348 |
| 1079231 | 8/1967 | United Kingdom | 355/8 |
| 1251271 | 1/1972 | United Kingdom | 355/67 |

*Primary Examiner*—Donald A. Griffin
*Attorney, Agent, or Firm*—Cushman, Darby & Cushman

[57] ABSTRACT

Disclosed is an exposure device which comprises a reflecting surface for converging a light from a light source into a beltlike flow of beams and a means for diffusedly reflecting the beam on the reflecting surface in the longitudinal direction of the light source.

9 Claims, 9 Drawing Figures

EXPOSURE DEVICE

BACKGROUND OF THE INVENTION

This invention relates to an exposure device for an electrophotographic copying machine, more specifically to a reflecting mirror for a light source in the exposure device employing the slit exposure method.

In general, an exposure device in an electrophotographic copying machine employing the slit exposure method is so constructed that a light from a light source, which has been condensed into a beltlike flow of beams by means of a reflecting mirror, is illuminated to the surface of an original, and the illuminated light is diffusedly reflected at the original surface, and then led to a sensitive body through an optical system including a slit, lens and mirror. In a normal lens used in such optical system, however, the intensity of illumination would drop in proportion to $\cos^4 \theta$ (here $\theta$ is an angle made by the incident ray with the axis of the lens . . . ). So the quantity of light is less in the peripheral portion of the imaging surface as compared with the central portion. This phenomenon exerts a bad influence on the resolution of the imaging surface. In order to eliminate the shortcoming of the lens by employing a common-use halogen lamp as a light source which is required to have high luminous intensity and to provide a beam wider than the width of the original, therefore, the quantity of light from the lamp must be so adjusted that the light quantity for the peripheral portion of the slit may be more than that for the central portion.

Thus, in order optionally to set the ratio of the light quantity, the full length of the lamp filament is not to be used as the light emitting portion, but the light emitting portion is divided into several portions.

Accordingly, the luminous intensity of beam blow from the lamp is given the corrugated distribution, as shown in FIG. 1. If a light from a lamp 1 with such the distribution of luminous intensity, which is disposed as a light source opposite to a reflecting surface 2 of a elliptic reflecting mirror, is converged onto an original surface as shown in FIG. 2, the distribution of illumination on the original surface in the longitudinal direction of the lamp 1 will give the same curve as that of the luminous intensity of the lamp itself. Consequently, the light diffusedly reflected at the original surface 3 forms an image on the sensitive body through a slit 13, causing striped patterns on copied pictures.

SUMMARY OF THE INVENTION

The object of this invention is to provide an exposure device capable of giving uniform distribution of illumination to an original surface through reflecting mirrors by using as a light source a halogen lamp with uneven distribution of luminous intensity, without reducing the resolution on the image forming surface.

DETAILED DESCRIPTION OF THE PREFERRED EMBODIMENT

Figure 1:
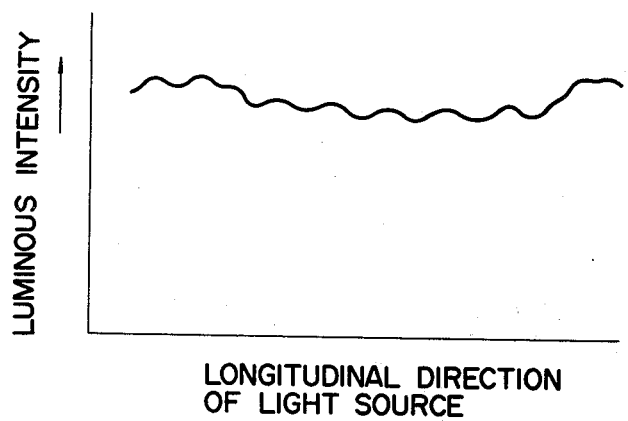
FIG. 1 shows a distribution of the luminous intensity of the lamp as the light source.
Figure 2:
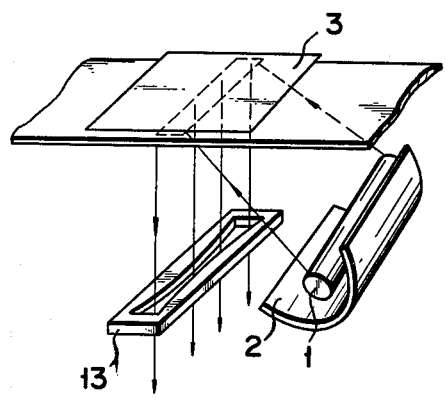
FIG. 2 is a perspective view of an exposure device according to the conventional slit exposure method.
Figure 3:
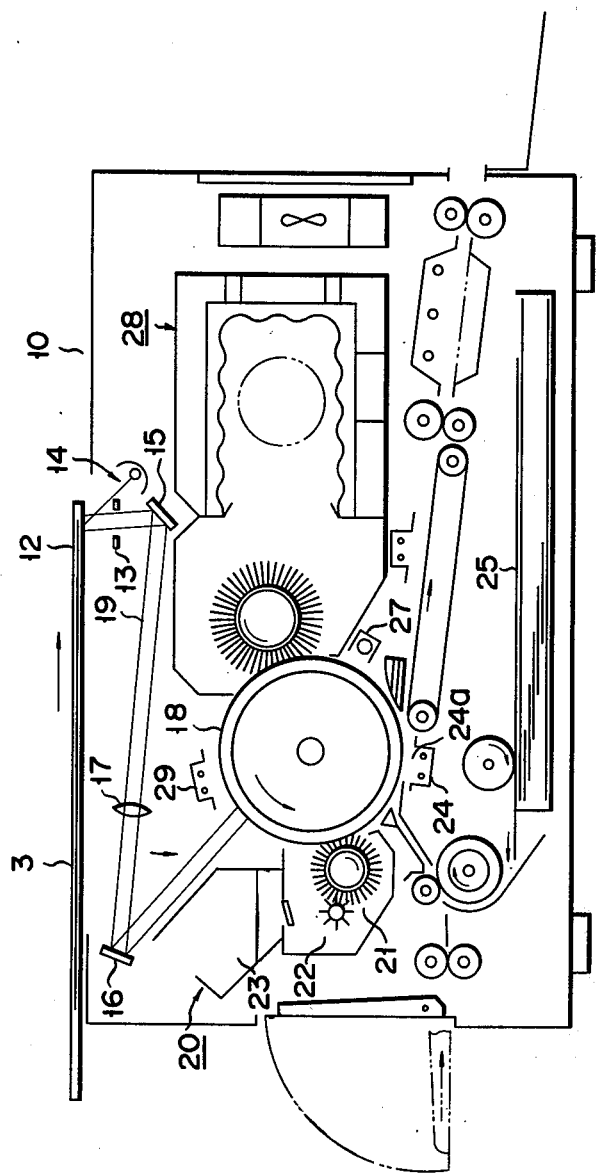
FIG. 3 is a schematic view of an electrophotographic copying machine with an exposure device according to this invention.

FIG. 3 shows the whole body of an electrophotographic copying apparatus including a main body 10, on the top of which a reciprocating original holder 12 is laid. The original holder 12 is formed of an openable cover and a glass base on which the cover is pivotally mounted, allowing an original 3 to be put thereon. The original holder 12 faces an exposure device 14 built in the body 10. The exposure device 14 faces an optical system composed of first and second mirrors 15 and 16 and a lens 17 disposed between these mirrors. A light from the exposure device 14 is projected and reflected on the original 12, led to the first mirror 15 through a slit 13, and further led to the second mirror 16 through the lens 17. Then the light is again reflected on the mirror 16 to form an optical path 19 which projects and forms an image of the original 3 on a sensitive body 18 as mentioned later. The sensitive body 18 is a cylindrical drum capable of rotating in the direction of the arrow. The whole surface of the outer periphery of the sensitive body 18 is uniformly and fully deposited to photo-conductive material such as selenium. Several devices are arranged radially along the periphery, and a developing device 20 is disposed biased to the rotating direction from the position where the image of the original is formed. The developing device 20 is composed of a magnetic brush 21 for coating the periphery of the sensitive body 18 with powder toner, a churning runner 22 for agitating the powder toner and carrier, and a toner supplier 23. Numeral 24 designates a transfer charger for charging a sheet of transfer paper 25, which charger forms along with the sensitive body 18 a transfer portion 24a. Further succesively arranged are a fluorescent lamp 27 for removing the remaining electric charge on the sensitive body 18, a cleaning device 28 including a rotating brush to remove the remaining toner on the sensitive body 18 and a filter, and a charger 29 for charging the sensitive body 18.

Now there will be described in detail the exposure device 4 which is constructed as shown in FIGS. 4 to 9.

Figure 4:
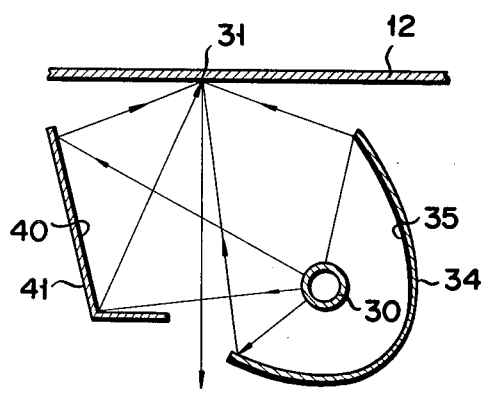
FIG. 4 is an enlarged sectional view of the exposure device of the invention.
Figure 5:
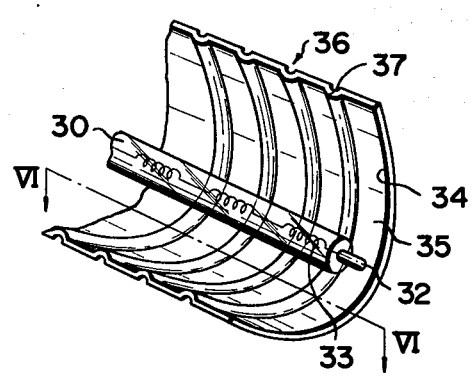
FIG. 5 is an enlarged partial perspective view of the right reflecting mirror of the exposure device of FIG. 4.
Figure 6:
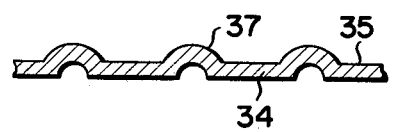
FIG. 6 is a sectional view as taken along line VI—VI of FIG. 5.

Referring first to FIGS. 4 and 5, there is shown a cylindrical lamp 30 enclosing a halogen gas with each end fixed by a terminal 32. Inside this lamp 30 several light spot sources 33 are arranged at suitable intervals in a filament connected between both terminals 32. These light spot sources 33 may be formed by partially shorting a spiral filament by means of a conductor. In this case, the conductor is to be lower than the filament in resistance, and portions of the filament which are not shorted form the light spot sources. Also, the light spot sources may be formed in other suitable ways. FIG. 4 shows the light spot sources only diagrammatically.

In back of the bar lamp 30 is disposed a reflecting mirror 34 with a reflecting surface 35 opposite to the lamp 30. The reflecting surface 35 is a part of an elliptic plane with the foci respectively on the center of the light source 30 and an exposure position on the original surface. Thus, lights from the light spot sources 33 are condensed into a belt-like flow of beams, and applied to the exposure position 31.

Figure 7:
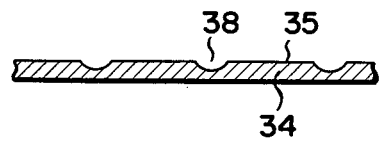
FIGS. 7 and 8 are sectional views of alternative examples of the reflecting mirror as shown in FIG. 6.
Figure 8:
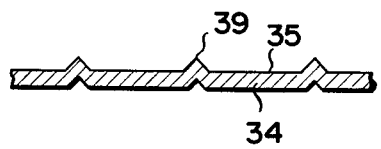
Figure 9:
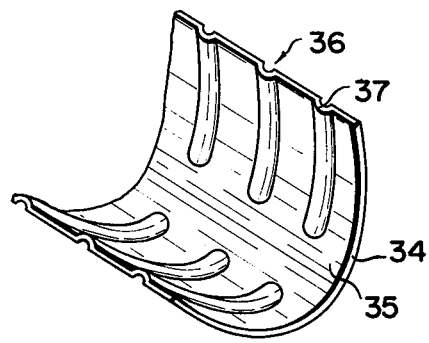
FIG. 9 is an enlarged perspective view of another reflecting mirror similar to FIG. 5.

Further, as shown in FIG. 5, rugged portions 36 are formed over the full length of the reflecting surface 35 of the reflecting mirror 34 in parallel with one another at regular intervals and at equal height along the elliptic plane of the reflecting surface. The rugged portion 36 is formed of an arcuate projection 37, but it may be replaced by a groove 38 formed in the reflecting surface 35 as shown in FIG. 7 or by a triangular projection 39 in the reflecting mirror itself as shown in FIG. 8. Alternatively, the projections 37 may be formed only on parts of the reflecting surface 35 which face each other, allowing the portion of the surface 35 opposite to the light source 30 to be smooth, as shown in FIG. 9. However, the rugged portions 36 need be formed neither at regular intervals nor at equal height, and may be arranged in parallel with one another at random intervals. However, it is essential that the reflecting surface 35 of each said rugged portion intersecting the light source 30 at right angles thereto should always form a part of a precise ellipse. The reflecting surface 35 is finished into a mirror surface by electrolytic polishing for a improved reflection coefficient.

As shown in FIG. 4, there is further provided an auxiliary reflecting mirror 41 with a substantially L-shaped reflecting surface 40 disposed forward the elliptic reflecting surface 35 of the reflecting mirror with the aforesaid construction. The auxiliary reflecting mirror 41 functions to condense the lights from the light spot sources onto the exposure position 31. The distribution of illumination at the exposure position 31 may be improved in uniformity by forming the aforementioned rugged portions in the reflecting surface 40 of the auxiliary reflecting mirror 41.

In the exposure device with the reflecting mirrors of the aforementioned constructions, the lights from the light spot sources 33 are condensed into a belt-like flow of beams by means of the reflecting surface 35 of the reflecting mirror 34 and the reflecting surface 40 of the auxiliary reflecting mirror 41, and then applied to the exposure position 31 of the original 3. Since the reflecting surfaces 35 and 37 are provided with the rugged portions 36, the lights from the light spot sources 33 are diffusedly reflected to be led to the exposure position 31. Consequently, the lights, which have been subjected to the uneven distribution of luminous intensity of the light spot sources 33, can be led the uniform distribution of illumination at the exposure position 31.

What is claimed is:

1. An exposure device for exposing an original to a belt-like flow of beams of light comprising:
    a mirror having a reflecting surface formed in an elliptical plane having a first line focus on a first line and a second line focus;
    a light source for exposing said original at said second line focus including a lamp having a number of light spot sources spaced along said longitudinal axis so as to direct light at said reflecting surface; and
    means for diffusedly reflecting said light from said reflecting surface in a direction defined by said first line, said means including rugged portions formed in said reflecting surface.

2. An exposure device according to claim 1, wherein the surface of each said rugged portion intersecting said light source at right angles thereto always has the shape of a precise ellipse.

3. An exposure device according to claim 1 further comprising an auxiliary reflecting surface disposed forward said reflecting surface for reflecting part of a beam from said reflecting surface and leading said beam to said exposure position.

4. An exposure device according to claim 3, wherein said auxiliary reflecting surface includes rugged portions.

5. An exposure device according to claim 4, wherein said rugged portions on said auxiliary reflecting surface is part of said elliptic plane.

6. An exposure device for exposing an original to a belt-like flow of beams of light comprising:
    an elliptical plane reflector having first and second line focuses and having elliptical irregularities on the reflector surface thereof for diffusedly reflecting light originating at said first focus of said reflector in the direction defined by said focuses;
    a lamp having a number of light spot sources disposed at intervals along the first focus of said elliptical reflector for exposing the original at said second focus.

7. An exposure device as in claim 1 or claim 6 wherein said lamp comprises a halogen lamp.

8. An exposure device as in claim 6 wherein said elliptical irregularities comprise elliptical ribs spaced in said longitudinal direction.

9. An exposure device as in claim 6 wherein said elliptical irregularities comprise a plurality of elliptical grooves spaced in said longitudinal direction.

* * * * *